(12) United States Patent
Trouve et al.

(10) Patent No.: US 10,287,187 B2
(45) Date of Patent: May 14, 2019

(54) MICROREACTOR AND METHOD FOR DESALINATING SALT WATER

(71) Applicant: David Trouve, Vacquières (FR)

(72) Inventors: Emmanuel Trouve, Vacquières (FR); Louis Guerin, Mondercange (LU)

(*) Notice: Subject to any disclaimer, the term of this patent is extended or adjusted under 35 U.S.C. 154(b) by 142 days.

(21) Appl. No.: 15/518,307

(22) PCT Filed: Jul. 30, 2015

(86) PCT No.: PCT/EP2015/067575
§ 371 (c)(1),
(2) Date: Apr. 11, 2017

(87) PCT Pub. No.: WO2016/058722
PCT Pub. Date: Apr. 21, 2016

(65) Prior Publication Data
US 2017/0305765 A1    Oct. 26, 2017

(30) Foreign Application Priority Data

Oct. 13, 2014  (LU) .......................................... 92571

(51) Int. Cl.
| C02F 1/469 | (2006.01) |
| C02F 1/46 | (2006.01) |
| C02F 103/08 | (2006.01) |
| C02F 1/00 | (2006.01) |

(52) U.S. Cl.
CPC .......... *C02F 1/4604* (2013.01); *C02F 1/4691* (2013.01); *C02F 1/00* (2013.01); *C02F 2103/08* (2013.01); *C02F 2201/46115* (2013.01)

(58) Field of Classification Search
CPC ... C02F 1/4604; C02F 1/4691; C02F 2103/08
See application file for complete search history.

(56) References Cited

U.S. PATENT DOCUMENTS

| 4,073,712 A | * | 2/1978 | Means | .................... B03C 5/026 |
| | | | | 204/554 |
| 2014/0197034 A1 | * | 7/2014 | Yaar | .................... C02F 1/14691 |
| | | | | 204/668 |

* cited by examiner

*Primary Examiner* — Steven A. Friday
(74) *Attorney, Agent, or Firm* — Steven M. Shape; Dennemeyer & Associates, LLC

(57) ABSTRACT

The present invention relates to an elongate microreactor (1) for desalinating a saline fluid (2), comprising at least one compartment (C1) for migrating ions, at least one compartment (C2) for separating ions and at least one compartment (C3) for collecting fluid, characterized in that first and second cathode electrodes (11A, 11B) and first and second anode electrodes (12A, 12B) each have a first surface (11F, 11G, 12F, 12G) that is in contact with the air and a second surface (11E, 11H, 12E, 12H) opposite said first surface, respectively, said second surface being in direct contact with a plastic wall (13B, 13C, 13A, 13D) that is in direct contact with the saline fluid.

17 Claims, 13 Drawing Sheets

MICROREACTOR AND METHOD FOR DESALINATING SALT WATER

BACKGROUND

Figure 1A:
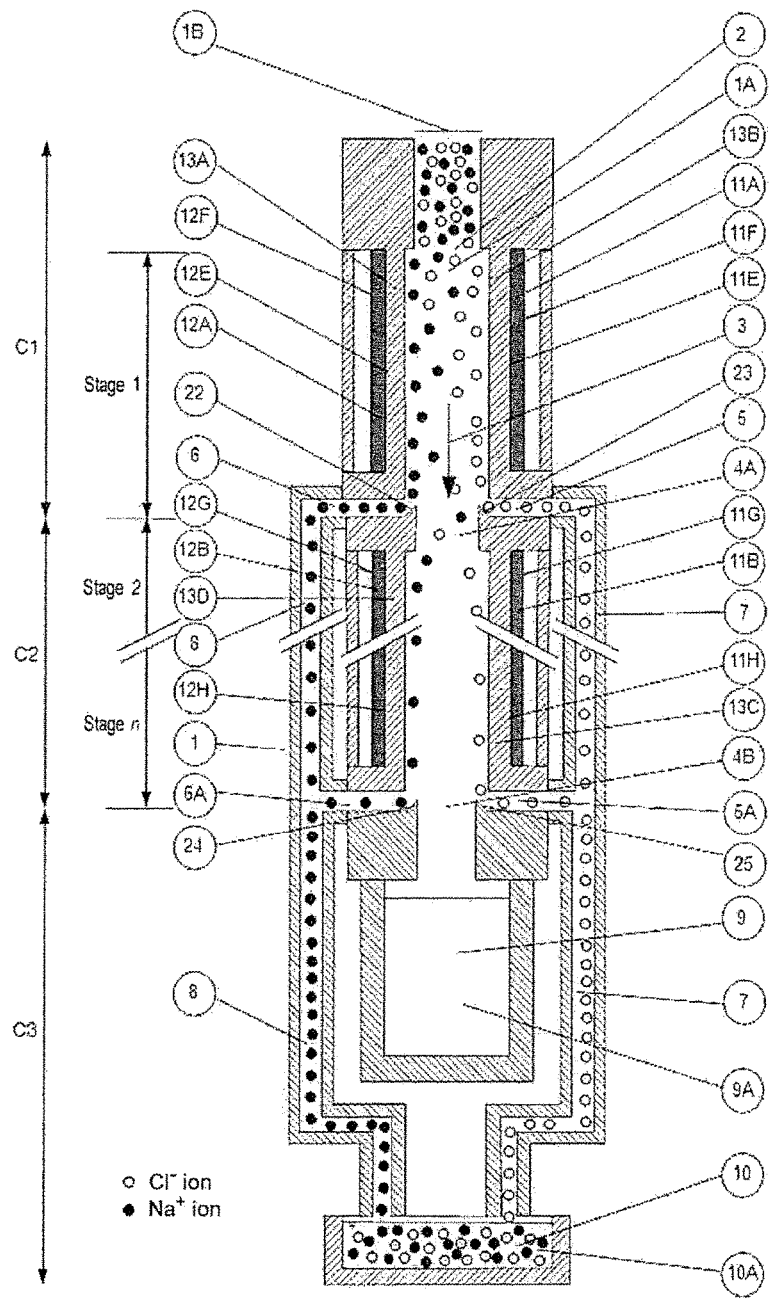

The present invention concerns a microreactor for the desalination of saline water according to claim 1 and a desalination method according to claim 15.

No society can survive without fresh water. Among the entire amount of water available on earth only 1% is available for plants, animals and humans, 97% of water is found in the oceans and 2% remain stored in the ice at the poles and in glaciers.

The overuse of fresh water reserves is becoming an increasingly greater problem in many parts of the world. Estimates predict that in 2030 two thirds of the world's population will suffer water shortages. According to UNESCO, in 2025, 75% of the world's population will live less than 60 km from the sea, the simplest and most efficient method to obtain fresh water is therefore to desalinate sea water.

There are two major categories of desalination techniques: thermal processes or membrane-based processes.

Among the thermal techniques, the most widely used known methods are:

Single effect distillation: this technique gives a low yield.

Multiple effect distillation (MED) well known in the prior art. This method strongly increases yield compared with single effect distillation.

Another significant improvement is brought by the so-called vapour compression technique.

A process using multi-stage flash distillation (MSF): one of the major problems with MED techniques is that of scaling. To overcome this problem, the MSF technique was developed in the 1960s.

A process using mechanical vapour compression (MVC).

Among the membrane processes, the most widely used known methods are: electrodialysis (ED), reverse osmosis (RO) and membrane distillation (MD).

The above-described processes are the most important and together they represent more than 90% of the desalination methods used over the world. There are other known methods of lesser importance, these being:

Crystallization processes: freeze desalination; gaseous hydration methods

Wetting methods: wetting-dewetting; solar evaporation—greenhouse effects; evaporation.

Ion exchange method

Liquid-liquid extraction method.

Flow-Through Capacitor method (FTC): this method is fairly similar to the electrodialysis method in that the ions are separated under the effect of an electrical field. However, contrary to electrodialysis, the FTC method does not use membranes but the ions are collected on porous electrodes e.g. aerogels. The applied voltage is moderated to prevent the occurrence of electrochemical reactions. The method is composed of two cycles. At the first cycle, called desalination cycle, an electrical potential difference is applied to the electrodes between which the saline water circulates. The ions migrate towards their respective electrodes and attach themselves thereto. Desalinated water leaves via the outlet of the system. After a certain time, the electrodes are saturated with ions. At this time, the second cycle called regeneration cycle is initiated: the voltages are reversed at the electrodes and the ions are released. Strongly saline water leaves the system. The first cycle is then recommenced.

DE 20315557 describes desalination equipment in which saline water passes by electrodes that are electrically charged either with positive charges or with negative charges. The electrodes are coated with a plastic insulator and they are also coated with an ion exchange layer, either anodic or cathodic. These layers adsorb sea water $Na^+$ and $Cl^-$ ions, which amounts to a first essential difference compared with the present invention which does not comprise any adsorption-release operation. DE 20315557 shows that the water flows continuously on the electrodes. On account of adsorption of the ions, the electrodes become charged and lose their efficacy. The polarity must then be reversed to release the ions: this implies that the flow of desalinated water is discontinuous, in sequenced batches, which amounts to a second essential difference compared with the present invention which uses a continuous flow of desalinated water. DE 20315557 does use electrodes that are insulated from the water by plastic. Nonetheless, the form of the electrodes fully differs from those of the present invention. In DE 20315557 the form used is a metal bar/wire form coated with plastic. In addition, on top of the plastic there is an ion adsorption layer. The plastic layer to a large extent, therefore acts as substrate for this absorption layer. The electrodes are then assembled and positioned in a channel in which the water to be desalinated circulates. In the present invention, the electrodes are of rectangular cross-section and are mounted in the walls of the channel. The plastic is used solely as insulator and does not receive an ion absorption layer. The essential difference is that in the present invention a main function of the plastic is to form the main channel. Also, the operating principle in DE 20315557 and of the present invention is not the same. DE 20315557, like the present invention, is based on the principle of capacitive de-ionisation. However, DE 20315557 operates along the conventional principle of this method, namely with successive adsorptions and desorptions and the flow of desalinated water is not continuous, contrary to operation in the present invention.

US 2014/197034 describes a desalination method wherein the sea water circulates longitudinally in a channel having a passage with a V-shaped or Y-shaped cross-section. Conveyor belts circulate on the angled walls of the chamber. They are driven by a motor and pulley system outside the chamber. The conveyor belts enter via the top of the chamber and leave at the bottom at the point where the angled walls meet up. Electrodes are attached to the angled walls that are positively or negatively charged. The conveyor belts are made of plastic film. Flexible electrodes are attached thereto. When the conveyor belts are moved, the dielectric film is directed towards the wall and the flexible electrodes are directed towards the water. When passing in front of the fixed electrodes, the flexible electrodes become charged and attract the mobile ions of the saline water, this amounting to a first essential difference with the present invention which does not comprise any adsorption-release operation. These ions remain attached onto the conveyor belts until the belts leave the chamber via the bottom of a V-shaped space. The flexible electrodes are then de-charged and the ions are released and recombine to salt. The corresponding system and infrastructure are fairly complex, however it clearly arises that the desalinated water must travel a significant distance within this large-size non-watertight structure, which amounts to another essential difference with the present invention which on the contrary requires the use of microreactors of very small size, the total required capacity being achieved through multiplication of the number of micro reactors in a suitable arrangement (numbering up rather than scale up). US 2014/197034 does describe a desalination system that operates however on a different principle to the present invention. In addition, the plastic films of the conveyor belts in US 2014/197034 simply act as substrate for the flexible electrodes which are in direct contact with water. No watertight system is mentioned in this document.

U.S. Pat. No. 4,073,712 describes a system wherein, by means of an electrical field, water is treated and purified. This system is not used for desalination but rather more to remove colloidal particles and to prevent formation thereof, which amounts to an essential difference with the present invention. The electrodes creating the electrical field are coated with a plastic layer. However, their form differs from those used by us. In addition, the applied voltages in the order of several kV are much higher than in the present invention (less than 100 V) which amounts to another essential difference. In addition, U.S. Pat. No. 4,073,712 does not comprise a two-flow separation system, one of saline water and the other of desalinated water, leading to yet another essential difference with the present invention which comprises a novel separation device, a coaxial separator having an original bevel to obtain optimal continuous separation of the two cited flows. U.S. Pat. No. 4,073,712 concerns a fully different application from the present invention and its construction differs fully from that of the present invention.

The difference between the present invention and the prior art is that said first and second cathode electrodes 11A,11B and said first and second anode electrodes 12A,12B each respectively have a first surface 11F,11G,12F,12G in contact with air and a second surface 11E,11H,12E,12H opposite said first surface, said second surface being in direct contact with a wall in plastic 13B,13C,13A,13D, said plastic wall 13B,13C,13A,13D being in direct contact with the saline fluid 2 (FIG. 1).

The technical effect associated with this difference is that of reducing energy needs compared with the prior art (see Table 1).

On the contrary, DE 20315557 discloses an electrode fully coated with a ring in plastic, said plastic being in contact with the saline water, and US 2014/0197034 discloses a device with conveyor belts that is not impervious to sea water which means that at least one longitudinal surface of the electrodes is in direct contact with the sea water.

No document shows the combination of the following technical elements:
saline water-plastic wall-electrode-air.

SUMMARY

The present invention solves the problem of desalinating sea water by improving the necessary energy yield i.e. by reducing energy needs. Sea water typically contains 20000 to 40000 ppm (mg(l) of dissolved solid substances, the most part being sodium chloride salt ($Na^+Cl^-$) (75%). The energy needs required to remove this salt in the different desalination techniques currently used are summarised in following Table 1:

TABLE 1

| Energy (MJ/m$^3$) | Energy (kWh(m$^3$) | Method (for desalination with r = 50%) |
|---|---|---|
| 2.8 | 1.0 | Lower theoretical limit for complete desalination |

TABLE 1-continued

| Energy (MJ/m$^3$) | Energy (kWh(m$^3$) | Method (for desalination with r = 50%) |
|---|---|---|
| 3.1-3.6 | 1.26 | Present invention |
| 6.7-13.3 | 2.0-3.75 | Conventional electrical deionisation: DE 20315557 and US 2014/197034 |
| 14.3 | 4.0 | Flash with energy recovery |
| 10.8-16.6 | 3.0-4.6 | FTC (electric) |
| 18.1 | 3.125-8.75 | Reverse osmosis only |
| 21.9-25.7 | 6.1-7.1 | Flash only |
|  | 3.75-18.75 | Thermal |

It follows from Table 1 that the energy needs for known desalination methods are very high. More economical techniques are needed to allow the desalination of large quantities of sea water and at low cost.

The microreactor of the present invention has the lowest energy consumption.

The problem that the present invention sets out to solve is to overcome the disadvantages of the prior art by applying methods requiring energy needs close to the theoretical limit for complete desalination of water. The theoretical limit is given in Table 1 above.

The solution to the problem set out above is to cause the ($Na^+Cl^-$) ions to migrate continuously from saline water, using a minimum driving force (electrical field), then to separate the water enriched with ions (concentrate) from the desalinated water via gravity flow through a separator device.

The proposed method differs extensively from the conventional FTC technique (FlowThrough Capacitors) which uses a succession of batches and a high amount of energy.

In the present invention, the cathode and anode electrodes are not in direct contact with the sea water since a smooth, watertight wall in plastic material separates the electrodes from the saline water. No electric current circulates through the liquid (saline or non-saline) during the functioning of the device. The separated $Na^+$ and $Cl^-$ ions will accumulate along the walls of the channel adjacent to the electrode having an opposite electric charge to that of the ions in the liquid. The fractions of water containing $Na^+$ and $Cl^-$ ions are removed via side openings in the respective channel receiving these ions. It follows that the main fraction of water leaving the system is continuously desalinated.

The advantages brought by the present invention are the following:
no porous walls, hence no direct contact between the electrodes and the liquid (elimination of ion/water-electrode contact)
eliminating of any circulation of electric current in the channel and hence in the water;
continuous operation contrary to cyclical desalination (sequenced) of a standard FTC installation;
combination of a method using a low current with microreactors.

The chemical reaction that occurs can be defined as follows:

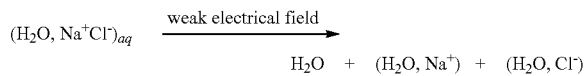

DETAILED DESCRIPTION

The present invention concerns a microreactor 1 to desalinate a saline fluid 2, of elongate shape comprising at least one ion migration compartment C1, at least one ion separation compartment C2 and at least one fluid collecting compartment C3: said ion migration compartment C1 comprising:
- at least one inlet opening 1B for saline fluid 2;
- at least one main channel 1A for the flow of saline fluid 2 defining a substantially vertical longitudinal axis;
- at least one first cathode electrode 11A and at least one first anode electrode 12A;
- at least one first upper lateral channel 6 for the evacuation of cations, substantially perpendicular to said main channel 1A;
- at least one second upper lateral channel 5 for the evacuation of anions, substantially perpendicular to said main channel 1A;

said ion separation compartment C2 comprising:
- at least one left upper lip 22 and at least one right upper lip 23 projecting inside the main channel 1A allowing the collection of ions;
- at least one second cathode electrode 11B and at least one second anode electrode 12B;
- at least one first left lateral channel 8 for the evacuation cations, substantially parallel to said main channel 1A;
- at least one second right lateral channel 7 for the evacuation of anions, substantially parallel to said main channel 1A;
- said main channel 1A for the flow of saline fluid 2 being positioned between the first lateral channel 8 and the second lateral channel 7;
- at least one first lower lateral channel 6A for the evacuation of cations, substantially perpendicular to said main channel 1A;
- at least one second lower lateral channel 5A for the evacuation of anions, substantially perpendicular to said main channel 1A;

said fluid collecting compartment C3 comprising:
- at least one left lower lip 24 and at least one right lower lip 25 projecting inside the main channel 1A;
- at least one inner vessel 9 collecting non-saline fluid 9A;
- at least one external vessel 10 collecting highly saline fluid 10A,
- characterized in that said first and second cathode electrodes 11A,11B and said first and second anode electrodes 12A,12B each respectively having a first longitudinal surface 11F,11G,12F,12G in contact with air and a second longitudinal surface 11E,11H,12E,12H opposite said first surface, said second surface being in direct contact with a wall in plastic 13B,13C,13A,13D which is in direct contact with the saline fluid 2.

Preferably the cathode electrode 11A,11B and the anode electrode 12A,12B either glued against the plastic wall 13A,13B or are press-fitted by means of a notch in the plastic wall 13A,13B or via any other securing method known to persons skilled in the art.

Preferably the cathode electrode 11A,11B and anode electrode 12A,12B lie parallel to a first wall 13A and to a second wall 13B of the main channel 1A respectively.

Preferably the length of the ion migration compartment C1 is between 35 mm and 55 mm, its width is between 20 mm and 30 mm and its height is between 10 mm and 20 mm.

Preferably the length of one stage of the ion separation compartment C2 is between 30 mm and 50 mm, its width is between 10 mm and 25 mm and its height is between 7 mm and 20 mm.

Preferably the length of the fluid collecting compartment C3 is between 35 mm and 55 mm, its width is between 20 mm and 30 mm and its height is between 10 mm and 20 mm.

Preferably said first and second anode electrodes 12A, 12B are positioned in the vertical continuation of one another, and said first and second cathode electrodes 11A, 11B are also positioned in the vertical continuation of one another.

Preferably, said upper lateral channel 6 for the evacuation of cations physically separates said first and second anode electrodes 12A,12B, and said upper lateral channel 5 for the evacuation of anions physically separates said first and second cathode electrodes 11A,11B.

Preferably, said left 22 and right 23 upper lips are of pointed shape with a bevelled portion respectively facing said first upper lateral channel 6 for the evacuation of cations and said second upper lateral channel 5 for the evacuation of anions.

Preferably, said left 24 and right 25 lower lips are of pointed shape with a bevelled portion respectively facing said first lower lateral channel 6A for the evacuation of cations and said second lower lateral channel 5A for the evacuation of anions.

Preferably, the microreactor comprises an electrical field between the electrodes 11 and 12 having a value of between 0.1 and 1000 kV·m−1, more preferably between 0.2 and 100 kV·m−1, further preferably between 0.5 and 5 kV·m−1.

Preferably, the microreactor comprises several identical ion separation compartments C2 which may be stacked on one another.

Preferably, the microreactor comprises a plurality of ion separation compartments C2, said compartments C2 being placed in series.

Preferably, the microreactor comprises a plurality of ion separation compartments C2, said compartments being placed in parallel.

preferably, the microreactor comprises a plurality of ion separation compartments C2, said microreactor being placed in a cassette.

The present invention also comprises a method for the desalination of saline fluid 2 in a microreactor defined in claim 1, comprising the following steps:
- first migration of anions towards at least one first cathode electrode 11A and of cations towards at least one first anode electrode 12A;
- respective separation of the cations and anions either side of the main channel 1A by means of at least one upper lip 22,23 projecting inside the main channel 1A of the flow of saline fluid 2,
- second migration of the anions towards at least one second cathode electrode 11B and of the cations towards at least one second anode electrode 12B;
- receiving of a non-saline fluid in a vessel 9 and of a highly saline fluid in a vessel 10, characterized by:
- the placing in contact with air of a first surface 11F,11G, 12F,12G of said first and second cathode electrodes 11A,11B and of said first and second anode electrodes 12A,12B respectively; and
- the placing in direct contact with a plastic wall 13B,13C, 13A,13D of a second surface 11E,11H,12E,12H opposite said first surface 11F,11G,12F,12G of said first and second cathode electrodes 11A,11B and said first and second anode electrodes 12A,12B; and direct contacting with the saline fluid 2 of said plastic wall 13B,13C,13A,13D.

Preferably said cathode electrode 11 and said anode electrode 12 are in contact over their entire length firstly with the plastic wall 13 of the main channel 1A and secondly with air or with a supporting wall.

Preferably the plastic wall 13 of the main channel 1A is impervious to any liquid.

Preferably, the inlet opening 1B for saline fluid has a width of between 0.1 mm and 20 mm, more preferably between 0.2 mm and 10 mm, further preferably between 0.5 mm and 5 mm.

Preferably, the device of the present invention has a total length of between 5 mm and 200 mm, more preferably between 10 mm and 100 mm, further preferably between 20 and 60 mm.

The velocity of the flow of fluid 2 in the main channel 1A is between 1 and 1000 mm·s$^{-1}$, more preferably between 2 and 500 mm·s$^{-1}$ and further preferably between 3 and 50 mm·s$^{-1}$.

An electrical field 22 is set up between the electrodes 11 and 12 and this field has a value of between 0.1 and 1000 kV·m$^{-1}$, preferably between 0.2 and 100 kV·m$^{-1}$, more preferably between 0.5 and 5 kV·m$^{-1}$.

Preferably, the device comprises at least one lip projecting inside the main channel 1A for the flow of saline fluid 2.

The device of the present invention, in longitudinal cross-section, is of square, rectangular or oval cross-section.

Preferably, said first lateral channel 6,8 for the evacuation of cations and said lateral channel 5,7 for the evacuation of anions are L-shaped.

The horizontal branch 5,6 of the L is substantially orthogonal to said main channel 1A and said electrodes 11,12.

The vertical branch 7,8 of the L is substantially parallel to said main channel 1A and said electrodes 11,12.

Several ion separation compartments can be positioned side by side within the device of the invention.

In a first embodiment, the present invention also concerns equipment comprising a plurality of devices, said devices possibly being placed in series.

In a second embodiment, the present invention also concerns equipment comprising a plurality of devices, said devices possibly being placed in parallel.

In a third embodiment, the present invention also concerns equipment comprising a plurality of devices, said devices being placed in a cassette i.e. in box format.

The present invention concerns a method for the desalination of a saline fluid 2 in a device of the present invention comprising the following steps:
 migration of the anions towards at least one cathode electrode 11 and of the cations towards at least one anode electrode 12;
 respective separation of the cations and anions either side of the main channel 1A by means of a lip 22,23,24,25 projecting inside the main channel 1A for the flow of saline fluid 2;
 receiving of a non-saline fluid in a vessel 9 and of a highly saline fluid in a vessel 10.

Figure 1B:
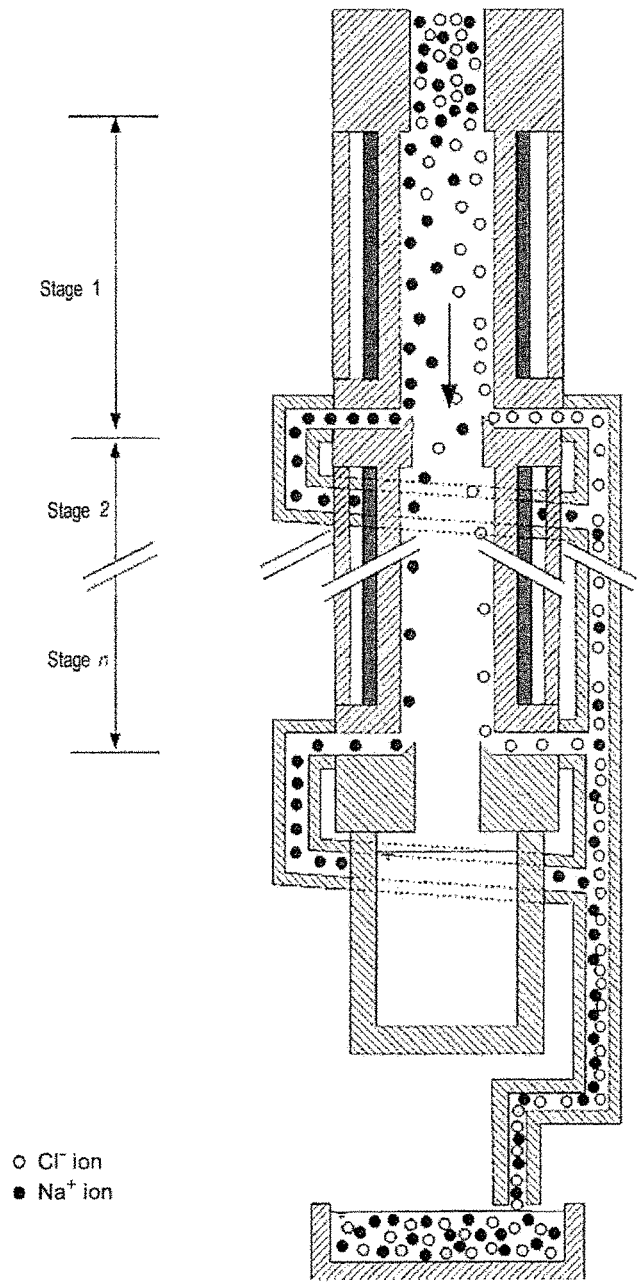
Figure 2:
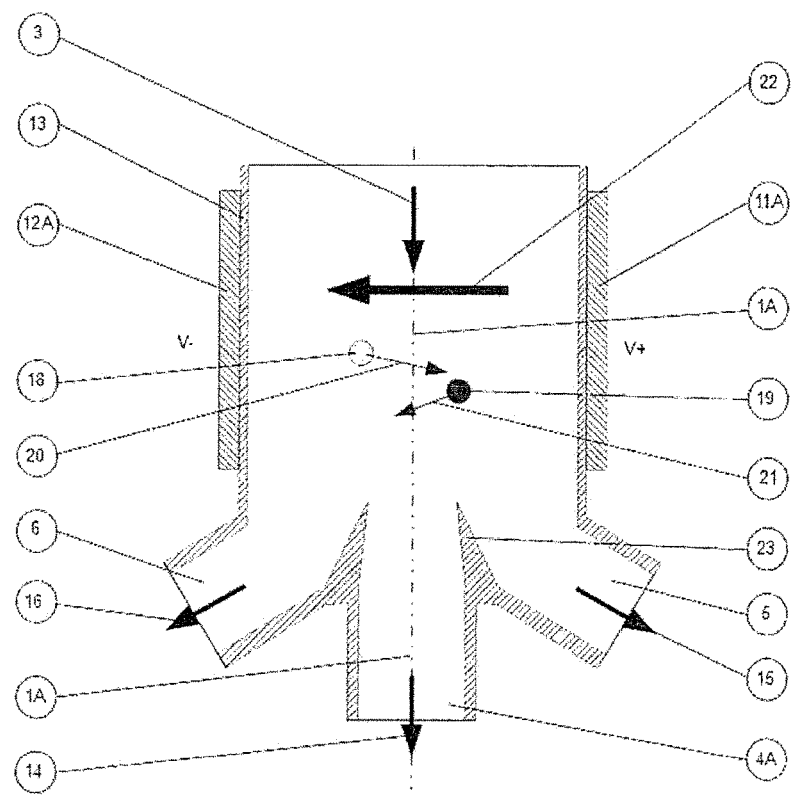

The present invention is described in the following Figures:
 FIG. 1A: illustrates a first embodiment of the desalination system of the present invention (not drawn to scale);
 FIG. 1B: illustrates a second embodiment of the desalination system of the present invention (not drawn to scale);
 FIG. 2: illustrates a basic cell of the present invention showing a lip 23 projecting inside the main channel 1A (not drawn to scale). The core of the system is the separator. This separator guarantees that the salt-containing water leaves the channel via the openings and the desalinated water remains in the system.

Figure 3:
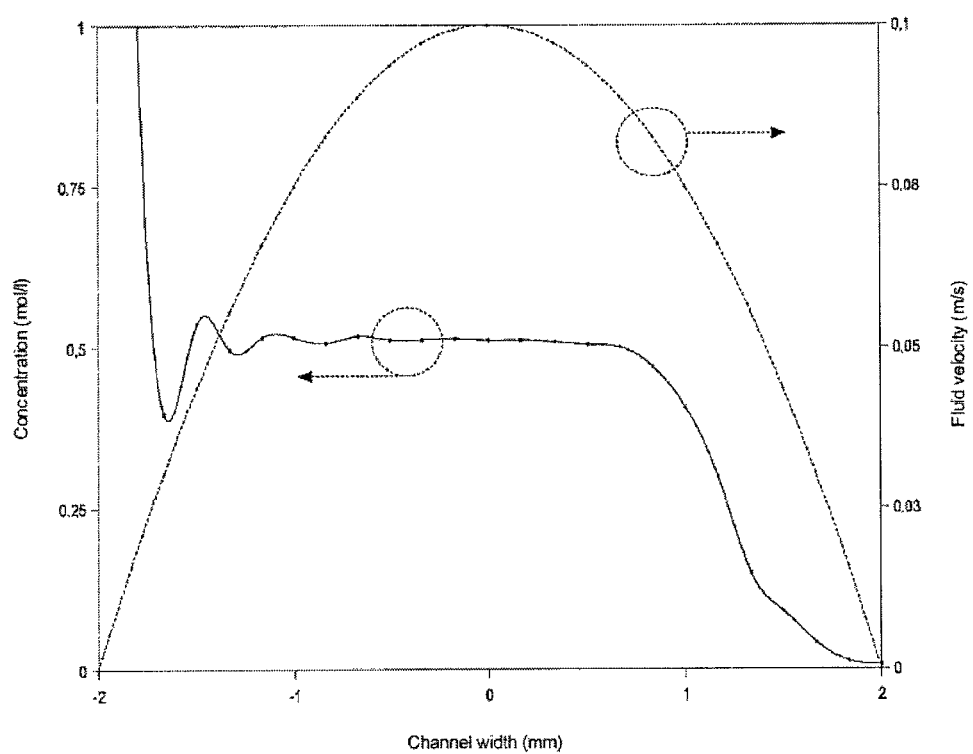

FIG. 3: is a graph showing an ion concentration in a lateral channel, with an electrical field and a velocity profile in this channel.

Figure 4:
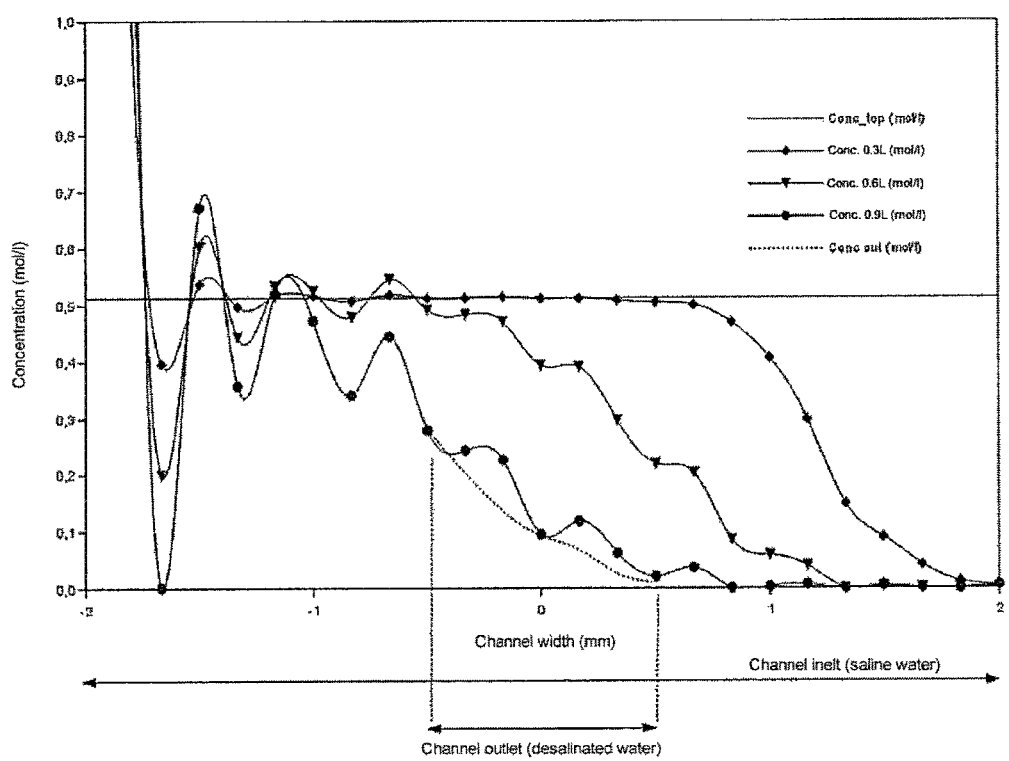

FIG. 4: is a graph showing an ion concentration as a function of the position of the ions along a lateral channel.

Figure 5:
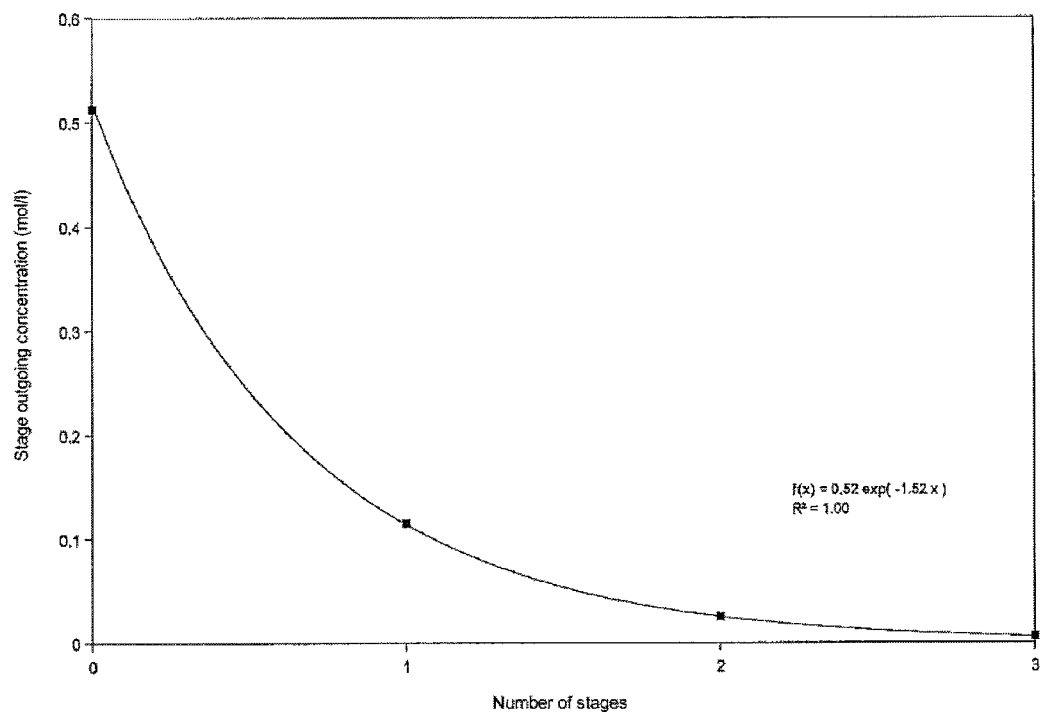

FIG. 5: is a graph showing Na$^+$Cl$^-$ concentration as a function of the number of stages.

Figure 6:
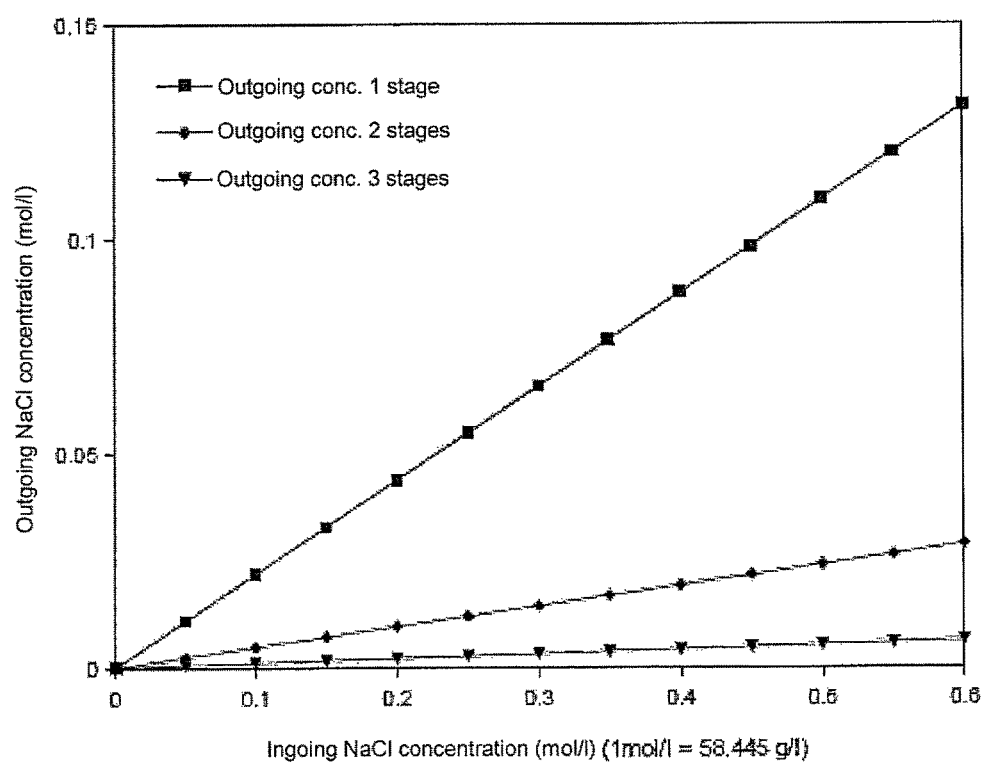

FIG. 6: is a graph showing the outgoing salt concentration as a function of the incoming salt concentration for 1, 2 and 3 desalination stages.

Figure 7:
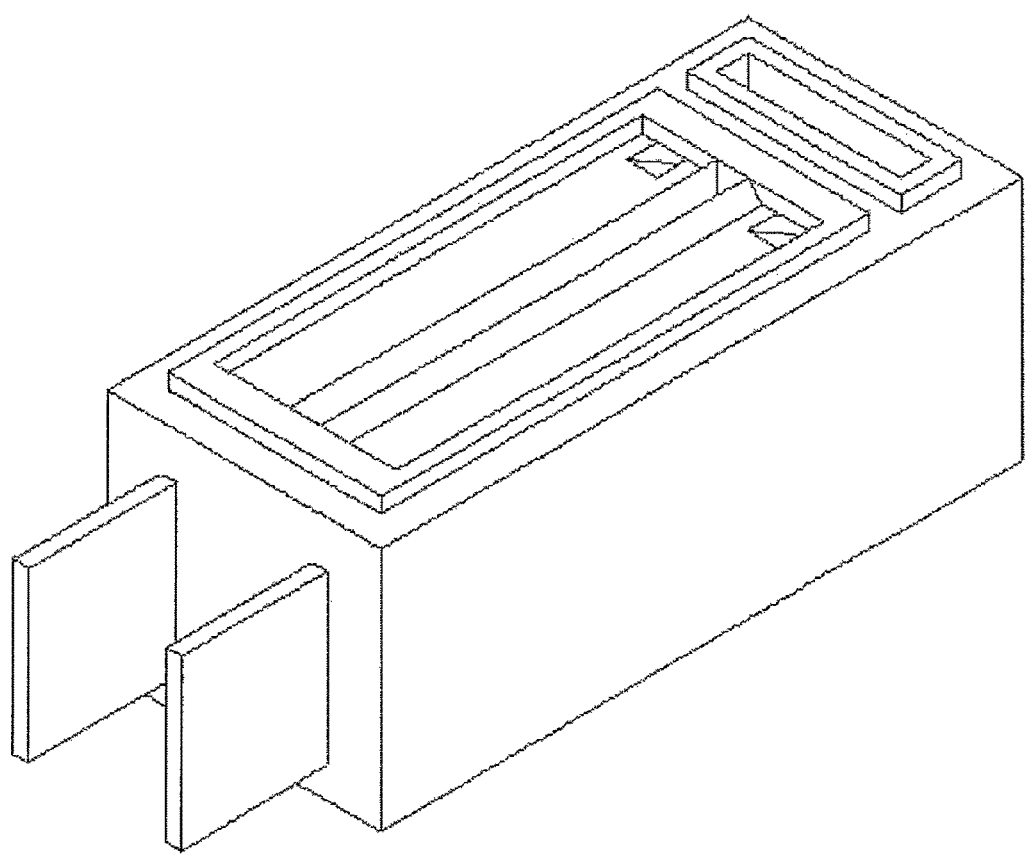

FIG. 7: gives a perspective view of a desalination stage of the present invention.

Figure 8:
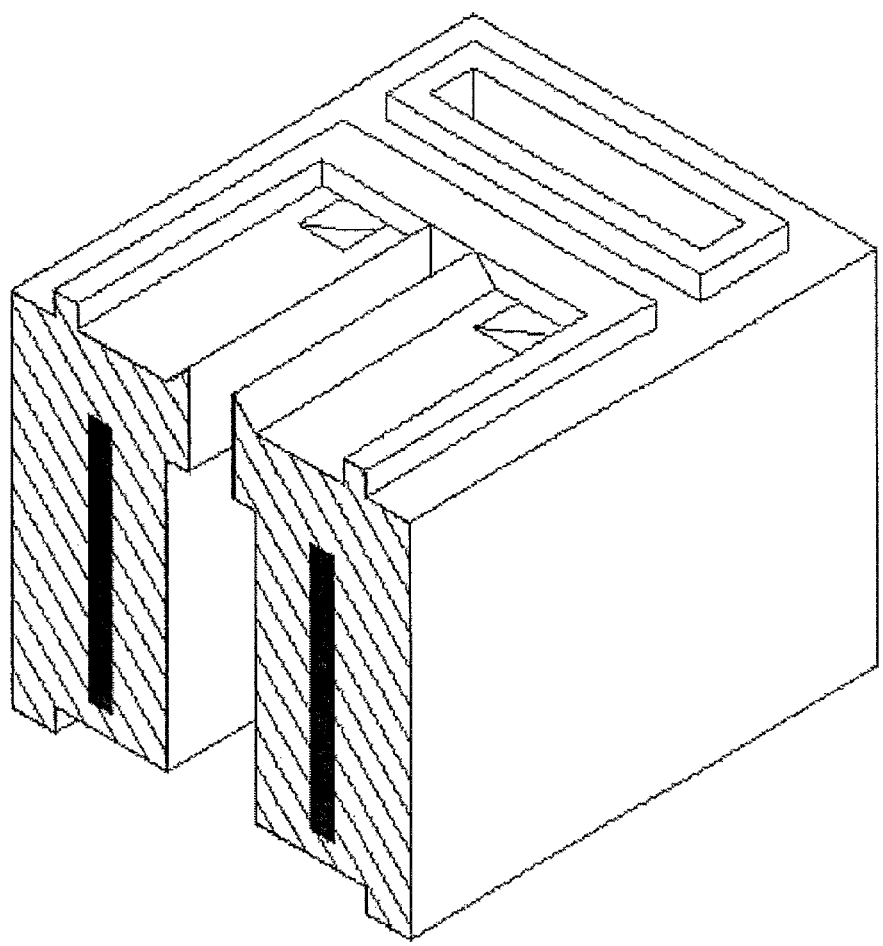

FIG. 8: gives a perspective cross-section through a desalination stage (not drawn to scale) of the present invention, the black rectangles corresponding to the two electrodes.

Figure 9:
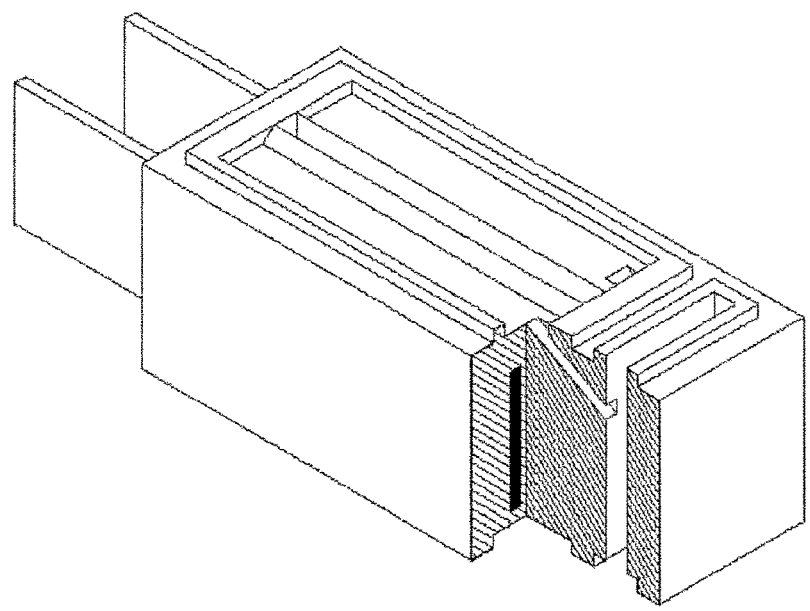

FIG. 9: gives a cross-section showing an evacuation channel for with high salt concentration (not drawn to scale), the black rectangle corresponding to an electrode.

Figure 10:
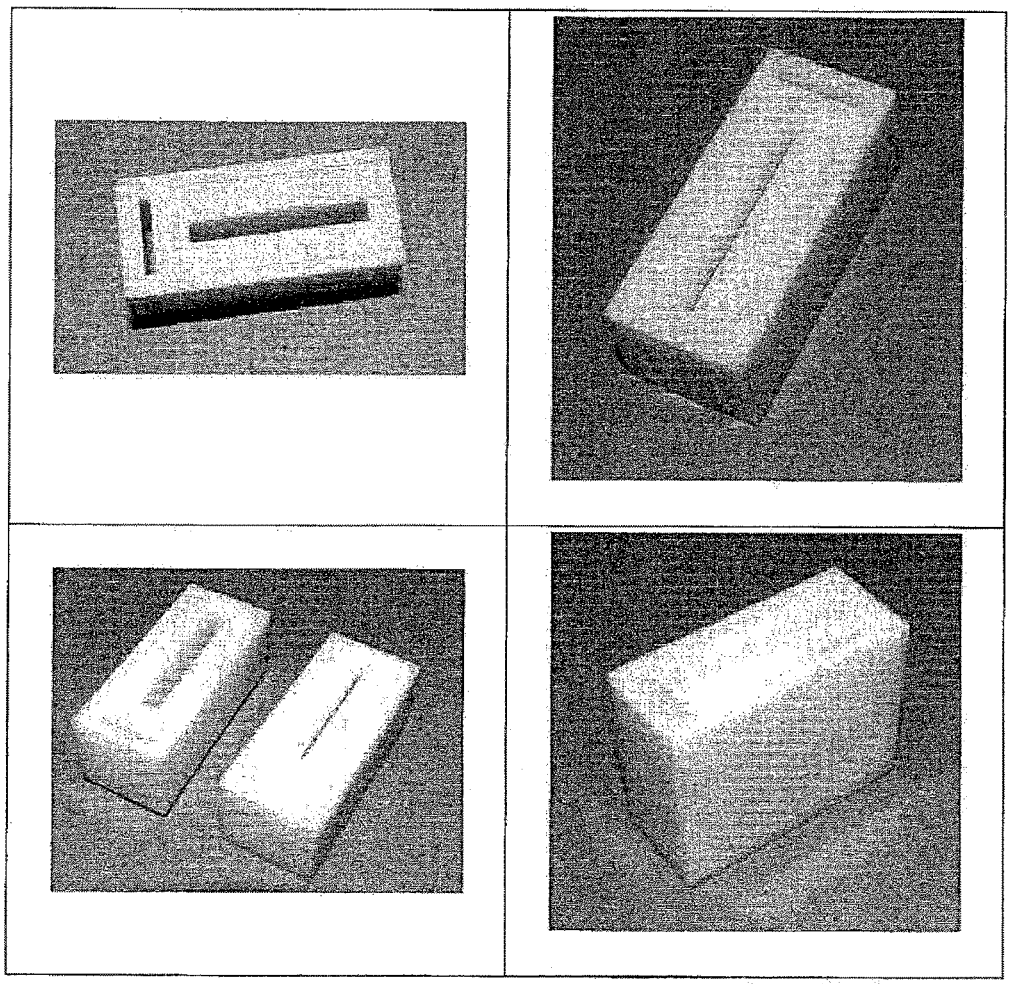

FIG. 10: is an underside view of the device of the present invention (top left), an overhead view of the device of the present invention (top right), a device with overhead view and underside view side by side (bottom left) and two assembled devices (bottom right). The device has the following dimensions: 42 mm (length)×18 mm (width)×17 mm (height).

Figure 11:
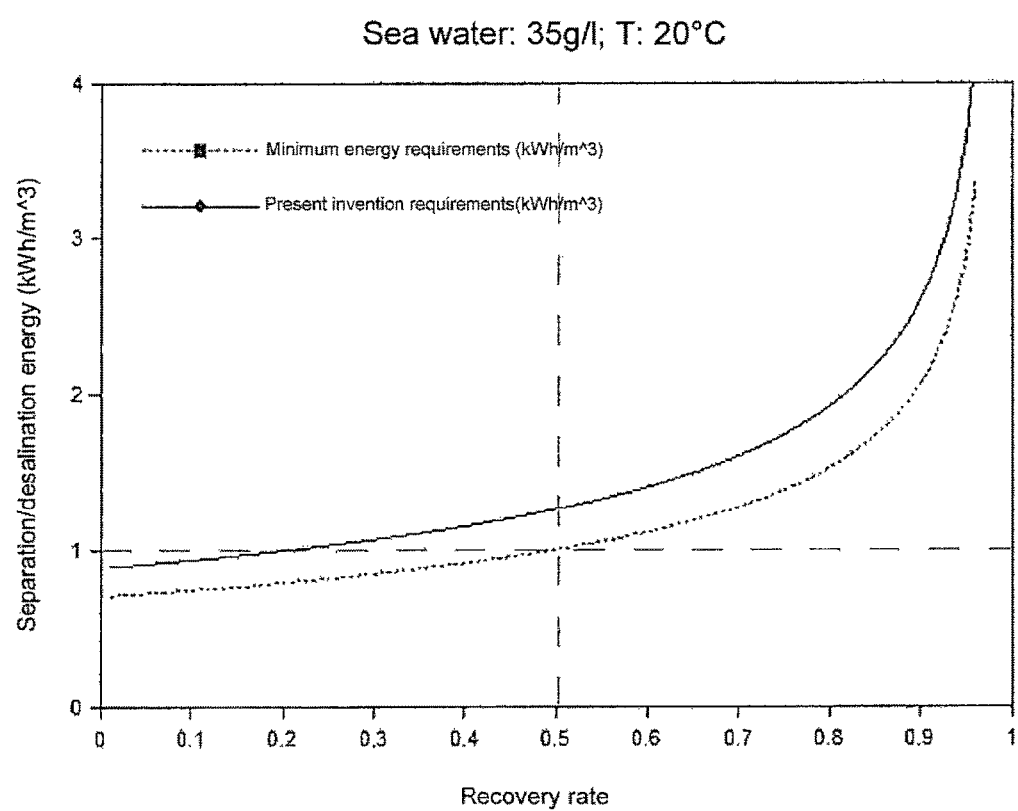

FIG. 11: illustrates the theoretical minimum energy requirements for desalination (dotted curve) and for the present invention (solid line curve).

Figure 12:
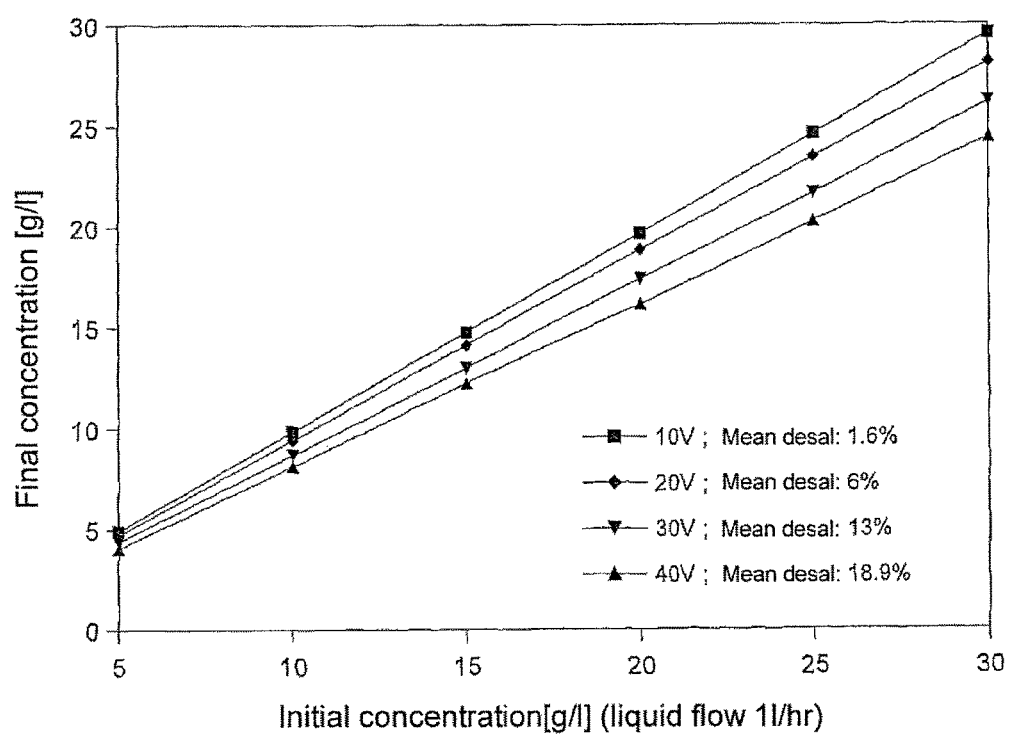

FIG. 12: illustrates the effect on desalination of the potential applied to the electrodes. The more the potential increases, the stronger the electrostatic field inside the channel and the greater the degree of desalination.

FIG. 2 illustrates the basic principle of the desalination microreactor 1 of the present invention, in particular that the saline water 2 enters via a thin opening 1B into main channel of the device and flows from top downwards 3 under gravity. The system is composed of three different identical stages—from 1 to n. At each stage, the saline water is subjected to an electrical field induced by the potential difference between the electrodes 11A and 12A. The electrodes are insulated from the water by a smooth, watertight wall 13A,13B in plastic. This field has the effect that the positive ions 19 i.e. Na$^+$ and negative ions 18 i.e. Cl$^-$ dissolved in the water are drawn towards the walls under the effect of the electrodes (cathode and anode). The ions migrate 20, 21 towards the respective walls where their concentration is increased. At the same time, the ions that have not migrated towards the walls 13, move down into the main channel 1A under gravity. At the bottom of each stage, a highly concentrated portion of water leaves the main channel via an outlet channel 5 for the negative ions and an outlet channel 6 for the positive ions. The water leaving the lower part and central part of the main channel of each stage 4 is water having a lower ion concentration than the water initially entering therein. The water with strong ion concentration then passes through channels 7 receiving the negative ions and channels 8 receiving the positive ions, and is collected in the vessel 10 having a strong concentration of positive and negative ions. The desalinated water is collected in vessel 9 receiving potable water.

FIG. 2 shows an individual separation stage. On each side of the channel there are two electrodes 11 and 12 separated from the main channel and from the fluid (liquid) by a smooth, thin watertight wall 13 in plastic material. This separation is most important since it electrically insulates the electrodes from the fluid (saline water). This structure can be compared to an electric capacitor having very high internal electrical resistance. It follows that no electric current is able to pass into the main channel, this implying that electric consumption is very low. The application of a potential difference between the two electrodes (positive voltage at electrode 11A and negative voltage at electrode 12A) sets up an electrical field 22 between the two electrodes. This electrical field is directed from the positive electrode 11A towards the negative electrode 12A and carries the negative ions 18 towards the positive electrode and positive ions 19 towards the negative electrode. In addition to this movement, the ions dissolved in the water carried downwards with the velocity 3 of the fluid under the effect of gravity.

FIG. 3 is a graph showing that the velocity profile is of parabolic shape (laminar flow, Poiseuille flow). The net movement of the ions therefore occurs towards the sides in the direction of the electrodes and towards the bottom of the device i.e. on the side opposite the fluid inlet side. At the fluid-wall interface, the ions are immobile since the rate of flow is zero. But as soon as the ions move away from the walls the velocity carries the ions downwards. On account of the electrical field, the ion concentration is greater close to the walls. On leaving the separation stage the flow is divided into three portions. This dividing is improved by the divider or lip projecting inside the main channel. The two side outlets 5 and 6 are intended for the fluid with high ion concentration 15 and 16, and the main channel 4 progressively evacuates the desalinated water 14.

The graph in FIG. 3 shows the ion concentration profile (here the positive ions) in the channel. The results are derived from simulations with finite elements. It is the concentration found at two thirds of the length of the main channel. The effect of the electrical field can clearly be seen. The second curve gives the profile of fluid flow velocity, this velocity indeed has a parabolic profile.

FIG. 4 illustrates ion concentration profiles (positive ions) at different points along the main channel. This FIG. 4 is based on calculations of finite elements. The horizontal straight line represents concentration at the inlet to the main channel. It is uniform over the entire width. The curve with diamonds represents the profile at a distance of one third after the inlet, the accumulation of ions close to the negative electrode is already quite extensive, whereas close to the positive electrode the depletion of positive ions is under way. In the middle of the channel the concentration is still fairly uniform. The curve with the triangles gives the profile midway between the inlet and outlet. The positive ions have increasingly moved towards the negative electrode. The concentration in the middle of the main channel is starting to decrease. The curve with the circles indicates the concentration profile just before the outlet of the separator. Again, the growing accumulation of ions close to the electrode can clearly be seen. Close to the positive electrode the concentration of positive ions is practically zero and in the middle of the channel it is very low. The curve with the dotted line represents the profile at the outlet of the stage. The mean concentration has decreased by 78% compared with the initial concentration.

FIG. 4 shows oscillations in the concentration profiles which increase along the main channel. These oscillations are due to the fact that the ions accumulate close to the wall of the main channel. On and after a certain concentration, new charges are unable to reach the wall and are repelled. Since the applied electrical field continues to direct them towards the electrode, they accumulate at a certain distance from the wall and create a new band with oscillations in the concentration profiles.

FIG. 5 shows the changes in concentration as a function of the number of desalination stages. The initial concentration (in this Figure) is 0.513 mole per liter of NaCl, which corresponds to the concentration of sea water. After 3 stages (n=3) the concentration drops to a value of 0.005 mole per liter of NaCl, which is the normal value of potable water.

FIG. 6 shows that the incoming concentration of 0.6 mol/l corresponds to sea water with high salt concentration, the mean concentration of sea water being 0.51 mol/l.

In FIG. 11 the recovery rate "r" is defined as being the ratio between the volume of saline water entering the system and the volume of desalinated water leaving the same system. For a rate "r" of 0.5, the minimum energy requirement is 1 kWh/m$^3$, whereas in the present invention this need is 1.26 kWh/m$^3$. It is therefore only slightly higher than the minimum energy requirement which makes the system of the present invention one of the best performing existing systems.

This is also illustrated in FIG. 12 giving different values of some desalination methods. It can clearly be seen that the microreactor of the present invention is the most economical energy-wise and that its requirements are only slightly higher than the minimum theoretical energy values. The values for the conventional "electrical" desalination technique, as described in patents DE20315557 and US2014/0197034 considered up until now to be the best available systems, are also higher than those of the present invention implying that the present invention has a much higher yield than in the prior art.

The basic unit is characterized by the setting-up of a flow of saline water, or water with Na$^+$Cl$^-$ ion concentration, in liquid streams of small hydraulic diameter (Dh), of between 0.1 mm and 20 mm, 0.1 and 19 mm, 0.1 and 18 mm, 0.1 and 17 mm, 0.1 and 16 mm, 0.1 and 15 mm, 0.1 and 14 mm, 0.1 and 13 mm, 0.1 and 12 mm, 0.1 and 11 mm, 0.1 and 10 mm, 0.1 and 9 mm, 0.1 and 8 mm, 0.1 and 7 mm, 0.1 and 6 mm, 0.1 and 5 mm; preferably between 0.2 mm and 20 mm, 0.2 and 19 mm, 0.2 and 18 mm, 0.2 and 17 mm, 0.2 and 16 mm, 0.2 and 15 mm, 0.2 and 14 mm, 0.2 and 13 mm, 0.2 and 12 mm, 0.2 and 11 mm, 0.2 and 10 mm, 0.2 and 9 mm, 0.2 and 8 mm, 0.2 and 7 mm, 0.2 and 6 mm, 0.2 and 5 mm;

more preferably between 0.3 mm and 20 mm, 0.3 and 19 mm, 0.2 and 18 mm, 0.3 and 17 mm, 0.3 and 16 mm, 0.3 and 15 mm, 0.3 and 14 mm, 0.3 and 13 mm, 0.3 and 12 mm, 0.3 and 11 mm, 0.3 and 10 mm, 0.3 and 9 mm, 0.3 and 8 mm, 0.3 and 7 mm, 0.3 and 6 mm, 0.3 and 5 mm;

further preferably between 0.4 mm and 20 mm, 0.4 and 19 mm, 0.4 and 18 mm, 0.4 and 17 mm, 0.4 and 16 mm, 0.4 and 15 mm, 0.4 and 14 mm, 0.4 and 13 mm, 0.4 and 12 mm, 0.4 and 11 mm, 0.4 and 10 mm, 0.4 and 9 mm, 0.4 and 8 mm, 0.4 and 7 mm, 0.4 and 6 mm, 0.4 and 5 mm;

most preferably between 0.5 mm and 20 mm, 0.5 and 19 mm, 0.5 and 18 mm, 0.5 and 17 mm, 0.5 and 16 mm, 0.5 and 15 mm, 0.5 and 14 mm, 0.5 and 13 mm, 0.5 and 12 mm, 0.5 and 11 mm, 0.5 and 10 mm, 0.5 and 9 mm, 0.5 and 8 mm, 0.5 and 7 mm, 0.5 and 6 mm, 0.5 and 5 mm.

The passage cross-section can be of any simple geometrical shape (round, elliptical, square, etc.), preferably of rectangular shape.

The total length L of the basic unit is between 5 mm and 200 mm, 6 mm and 190 mm, 7 mm and 180 mm, 8 mm and 170 mm, 9 mm and 160 mm, 10 mm and 150 mm, 11 mm and 140 mm, 12 mm and 130 mm, 13 mm and 120 mm, 14 mm and 110 mm, 15 mm and 100 mm, 16 mm and 90 mm, 17 mm and 80 mm, 18 mm and 70 mm, 19 mm and 60 mm, 20 mm and 50 mm.

The total length L of the basic unit is between 5 mm and 200 mm, preferably between 10 mm and 100 mm, more preferably between 20 and 60 mm, further preferably between 25 mm and 50 mm, and it is divided into:

a length $L_{elec}$ over which the flow occurs under an electrical field, dedicated to ion migration;

a length $L_{sep}$ over which the flow is separated into two fractions, one rich in $Na^+Cl^-$ ions and the other depleted of $Na^+Cl^-$ ions.

The total length L being defined as the distance in mm between the inlet 1B of saline water 2 and the vessel 10 with high $Na^+Cl^-$ concentration.

Flow occurs under gravity at a velocity v of between 1 and 1000 mm·s$^{-1}$, preferably between 2 and 500 mm·s$^{-1}$, more preferably between 3 and 50 mm·s$^{-1}$.

The electrical field applied is orthogonal to the fluid in the main channel, and its value is between 0.1 and 1000 kV·m$^{-1}$, preferably between 0.2 and 100 kV·m$^{-1}$, further preferably between 0.5 and 5 kV·m$^{-1}$.

A concentric separation device is positioned immediately after the electrical field application zone and comprises:

in the centre, a collector (lip shaped) projecting inside the main channel 1A to collect the desalinated or de-ionised fraction of water, the radius $R_{outp}$ being determined by the ion concentration gradient at the wall of the liquid stream.

On the periphery, an annular collector to collect the fraction of water with ion or salt concentration.

On each of these two outlets there may be positioned synchronized devices regulating flow velocities, said devices possibly being passive (syphon) or active (control valve).

Alternatively, the sub-fractions rich in cations and anions may not be mixed together, and the system then produces three fractions instead of two.

To reach the capacities required for industrial applications of the desalination or deionisation method of the present invention, the principle of numbering up is applied and translates as the following elements:

the basic units remain of optimal size: they therefore belong to the family of microreactors;

a large number of basic units can be associated in parallel via a system of migration zone (MZ) plates and separation zone (SZ) plates:

in an alternative construction, a migration part (mz) and a separation part (sz) may be pre-assembled in a single part (mz+sz), and a plurality of said single parts forms a complete plate (MZ+SZ);

the separation zone plates cover a range in accordance with applications (sea HC, sea LC, brackish, industry mono ION, industry pluri ION, . . . );

a number n of plates may be superimposed, n possibly being between 2 and 30, between 2 and 20, between 2 and 15, preferably between 3 and 12, more preferably between 4 and 8, further preferably between 5 and 7, and most preferably 6, with alternating MZ plates and SZ plates;

a collector zone (CZ) plate terminates the stack at the base, and a distributing zone (DZ) plate starts the stack at the top;

the stacking sequences from top to bottom is therefore: DZ: n(MZ+SZ): CZ.

In a SZ plate, separation can be obtained via a lip and via different types of SZ plates of different sizes and different shapes to cover all applications.

Alternatively, a set of plates can be pre-assembled in a cassette.

A device regulating the rate of flow of the concentrated flow fractions can be positioned in the final fluid collector zone, and can be servo-controlled by measurement of conductivity or flow rate.

A device regulating the rate of flow of the fraction of desalinated or deionised water can be positioned in the final fluid collector zone, and can be servo-controlled by measurement of conductivity or flow rate.

Some characteristics of the invention described in the form of separate embodiments may also be provided in combination in a single embodiment. In contrast, some characteristics of the invention which are described in the form of embodiments combined in a single embodiment can also be provided separately in the form of several separate embodiments.

The invention claimed is:

1. Microreactor (1) for the desalination of a saline fluid (2) comprising at least one ion migration compartment (C1), at least one ion separation compartment (C2) and at least one fluid collecting compartment (C3):

said ion migration compartment (C1) comprising:
at least one inlet opening (1B) for the saline fluid (2);
at least one main channel (1A) for the flow of saline fluid (2);
at least one first cathode electrode (11A) and at least one first anode electrode (12A);
at least one first upper lateral channel (6) for the evacuation of cations, substantially perpendicular to said main channel (1A);
at least one second upper lateral channel (5) for the evacuation of anions, substantially perpendicular to said main channel (1A);

said ion separation compartment (C2) comprising:
at least one left upper lip (22) and at least one right upper lip (23) projecting inside said main channel (1A) allowing collection of the ions;
at least one second cathode electrode (11B) and at least one second anode electrode (12B);
at least one first lateral channel (8) for the evacuation of cations, substantially parallel to said main channel (1A);
at least one second lateral channel (7) for the evacuation of anions, substantially parallel to said main channel (1A);
said main channel (1A) for the flow of saline fluid (2) being positioned between the first lateral channel (8) and the second lateral channel (7);
at least one first lower lateral channel (6A) for the evacuation of cations, substantially perpendicular to said main channel (1A);
at least one second lower lateral channel (5A) for the evacuation of anions, substantially perpendicular to said main channel (1A);

said fluid collection compartment (C3) comprising:
at least one left lower lip (24) and at least one right lower lip (25) projecting inside the main channel (1A);
at least one inner vessel (9) collecting a non-saline fluid (9A);
at least one external vessel (10) collecting a highly saline fluid (10A);

characterized in that
said first and second cathode electrodes (11A,11B) and said first and second anode electrodes (12A,12B) each respectively have a first surface (11F,11G,12F,12G) in contact with air and a second surface (11E,11H,12E, 12H) opposite said first surface, said second surface being in direct contact with a plastic wall (13B,13C, 13A,13D) which is in direct contact with the saline fluid (2).

2. The microreactor according to claim 1, wherein the cathode electrode (11A, 11B) and anode electrode (12A, 12B) are parallel to a first wall (13A) and to a second wall (13B) of the main channel (1A) respectively.

3. The microreactor according to claim 1, wherein the length of the ion migration compartment (C1) is between 35 mm and 55 mm, its width is between 20 mm and 30 mm and its height is between 10 mm and 20 mm.

4. The microreactor according to claim 1, wherein the length of a stage of the ion separation compartment (C2) is between 30 mm and 50 mm, its width is between 10 mm and 25 mm and its height is between 7 mm and 20 mm.

5. The microreactor according to claim 1, wherein the length of the fluid collection compartment (C3) is between 35 mm and 55 mm, its width is between 20 mm and 30 mm and its height is between 10 mm and 20 mm.

6. The microreactor according to claim 1, wherein said first and second anode electrodes (12A,12B) are positioned in the vertical continuation of one another, and said first and second cathode electrodes (11A,11B) are also positioned in the vertical continuation of one another.

7. The microreactor according to claim 1, wherein said upper lateral channel (6) for the evacuation of cations physically separates said first and second anode electrodes (12A,12B), and said upper lateral channel (5) for the evacuation of anions physically separates said first and second cathode electrodes (11A,11B) respectively.

8. The microreactor according to claim 1, wherein said left (22) and right (23) upper lips are of pointed shape with a bevelled portion respectively facing said first upper lateral channel (6) for the evacuation of cations and said second upper lateral channel (5) for the evacuation of anions.

9. The microreactor according to claim 1, wherein said left (24) and right (25) lower lips are of pointed shape with a bevelled portion respectively facing said first lower lateral channel (6A) for the evacuation of cations and said second lower lateral channel (5A) for the evacuation of anions.

10. The microreactor according to claim 1, wherein an electrical field between electrodes (11) and (12) has a value of between 0.1 and 1000 kV·m$^{-1}$.

11. The microreactor according to claim 1, wherein an electrical field between electrodes (11) and (12) has a value of between 0.2 and 100 kV·m$^{-1}$.

12. The microreactor according to claim 1, wherein an electrical field between electrodes (11) and (12) has a value of between 0.5 and 5 V·m$^{-1}$.

13. The microreactor according to claim 1, wherein several identical ion separation compartments (C2) can be stacked on one another.

14. The microreactor (1) according to claim 1, comprising a plurality of ion separation compartments (C2), said compartments (C2) being placed in series.

15. The microreactor (1) according to claim 1, comprising a plurality of ion separation compartments (C2), said compartments (C2) being placed in parallel.

16. The microreactor (1) according to claim 1, comprising a plurality of ion separation compartments (C2), said microreactor being placed in a cassette.

17. A method for the desalination of a saline fluid (2) in a microreactor defined in claim 1, comprising the following steps:
    at least first migration of anions towards at least one first cathode electrode (11A) and of cations towards at least one first anode electrode (12A);
    respective separation of the cations and anions either side of the main channel (1A) by means of at least one upper lip (22,23) projecting inside the main channel (1A) of the flow of saline fluid (2);
    at least one second migration of the anions towards at least one second cathode electrode (11B) and of cations towards at least one second anode electrode (12B);
    receiving of a non-saline fluid in a vessel (9) and of a highly saline fluid in a vessel (10), characterized by:
    placing in contact with air a first surface (11F,11G,12F, 12G) of said first and second cathode electrodes (11A, 11B) and of said first and second anode electrodes (12A,12B) respectively; and
    directly placing in contact with a plastic wall (13B,13C, 13A,13D) a second surface (11E,11H,12E,12H) opposite said first surface (11F,11G,12F,12G) of said first and second cathode electrodes (11A,11B) and of said first and second anode electrodes (12A,12B); and
    directly placing in contact said plastic wall (13B,13C, 13A,13D) with the saline fluid (2).

* * * * *